Patented Oct. 4, 1938

2,131,733

UNITED STATES PATENT OFFICE 2,131,733

CELLULOSE DERIVATIVES

Joseph F. Haskins and Robert W. Maxwell, Wilmington, Del., assignors to E. I. du Pont de Nemours & Company, Wilmington, Del., a corporation of Delaware No Drawing. Application February 1, 1935, Serial No. 4,444

21 Claims. (Cl. 260—152)

This invention relates to new processes for the preparation of cellulose ethers, and more particularly to the preparation of cellulose ethers of a low degree of substitution, soluble in caustic alkali solutions or in water, but insoluble in organic solvents, and still more particularly to the preparation of cellulose ethers from etherifying agents soluble in water.

This invention has as an object the preparation of low substituted cellulose ethers, i. e., cellulose ethers containing up to one mol of substituent per glucose unit, of a high degree of uniformity, and soluble in dilute aqueous caustic alkali solutions and in water. A further object is the preparation of water or caustic alkali soluble cellulose ethers of a lower degree of substitution than can be otherwise prepared. A still further object is the preparation of cellulose ethers which can be formed into sheets, filaments, etc., of greater strength than those prepared by previous processes. A still further object is the preparation of low substituted ethers in higher yields.

These objects are accomplished by the following invention wherein cellulose is steeped in an excess of a solution of the etherifying agent in water, the excess expressed, and the thus impregnated cellulose treated with caustic alkali solution in water or in mixtures of water and alcohol to complete etherification.

In the previous processes for the preparation of low substituted ethers, because of the difficulty of mixing uniformly a small quantity of etherifying agent with a large quantity of alkali cellulose, products of poor uniformity resulted particularly when the etherifying agent was only slightly volatile at the reaction temperature. In order to insure solubilization of all fibers unnecessarily high quantities of reagent were necessary and this resulted in higher degrees of etherification than was desirable. Higher degrees of substitution in the case of alkali soluble products resulted in bodies of low wet strength when formed in sheets and filaments. In the usual processes with alkali cellulose as the starting material, appreciable quantities of cellulosic materials are lost by extraction by the steeping caustic, lowering the yield and increasing the cost of the finished product considerably. Altho alkali cellulose may be made without loss by mixing cellulose and aqueous caustic in a suitable mixer, cellulose derivatives made therefrom are of poor uniformity.

The caustic alkalies are in general applicable in the process of the present invention. In general all etherifying agents which are soluble in water are applicable. Those which boil at temperatures close to that of the reaction or which react with alkali to give compounds boiling close to the temperature of reaction, however, do not give products of as good solubility as the less volatile etherifying agents. The cellulose may be loose or in sheets or in any form which can be subjected without damage to the mixing step. The steeping may be carried on in batches or continuously using cellulose in roll or sheet form.

The concentrations of the steeping solution may be varied within wide limits and will be governed by the quantity of substituent which it is desired to introduce into the cellulose. With low concentrations of etherifying agent, a short time of steeping is sufficient, but with higher concentrations times as great as 24 hours are desirable. Although the process as described gives improved uniformity, the presence of wetting agents in the steeping liquor further improves the uniformity. While generally it is possible to steep at room temperature, it may be desirable to steep at temperatures approaching the boiling point of the steeping solution especially where the solubility of the etherifying agent is low, or high concentrations are desired.

After steeping, the cellulose must be pressed free of excess liquor. The weight to which the steeped cellulose is pressed depends upon the quantity of etherifying agent to be left in the mixture. When less than one mol of reagent per glucose unit of the cellulose is to be used, it has been found convenient to press to such a ratio that one part of the cellulose contains 1 to 2 parts of water plus the necessary quantity of alkylating agent. With higher ratios of reagent to cellulose, other ratios may be desirable. The pressed liquors can be used again for steeping further lots of cellulose. A slight decrease in concentration of the pressed liquor occurs due to adsorption by the cellulose. For most purposes however, this change is so small that it may be ignored, altho the concentration of the steeping bath may be fortified by the addition of the necessary components.

The pressed cellulose-etherifying agent mixture is placed in a shredder or other type mixing machine and after the mass has been partially disintegrated, alkali solution is added preferably with the use of a spraying device. The concentration and quantity of caustic depends upon the type of reaction. In general, the greater the volume of caustic the more uniformly will it be dispersed. The caustic may be added in aqeous solution or in solution in a mixture of water and alcohol. The use of alcohol is especially desirable where the presence of excess water is harmful. Several hours are required for the caustic to become thoroughly mixed with the etherifying mixture. The mixing may be continued until the reaction is complete, or the mixture may be removed and stored until the reaction is over. The product may be aged after the reaction.

Having outlined above the general purposes and principles of the invention, the following applications thereof to certain specific instances are included for purposes of illustration and not in limitation.

Eighty parts of wood cellulose in sheet form were steeped in a solution of sodium chloroacetate prepared by neutralizing 180 parts of chloracetic acid in 340 parts of water with 160 parts of sodium bicarbonate (approximately 223 parts sodium chloroacetate in 375 parts of water. After 2 hours, the sheets were removed and pressed to a weight of 220 parts. The pressed sheets were placed in a shredder and after being distintegrated for one hour, 53 parts of sodium hydroxide in 67 parts of water was run in slowly. Mixing was continued in the shredder for 20 hours. The product was a highly viscous, almost fiber free solution when dissolved in 7% sodium hydroxide. The solutions were of much better solubility and filtered with greater ease than products prepared either by mixing solid sodium chloroacetate with alkali cellulose or by mixing solid sodium chloroacetate with cellulose and then mixing in caustic afterwards, when the ethers are of the same viscosity, and were prepared from the same cellulose with the same quantity of sodium chloroacetate. The quantity of alkylating agent used equalled one mol. per glucose unit of the cellulose.

Example 2

The procedure in this exemplification of the invention was the same as in Example 1 except that the steeping solution contained .25% of sodium salts of acids prepared from primary branch chain alcohols of 6–8 carbon content prepared synthetically by the reduction of carbon monoxide under pressure. The product before solution was more fluffy than the product of Example 1 and, when dissolved, gave solutions of equal viscosity but containing fewer insoluble fibers.

Example 3

The procedure and quantities were the same as in Example 1 except that to the caustic solution was added 20 parts of 95% methanol. The product resembled that of Example 1 but contained an even lower proportion of insoluble fibers.

Example 4

One hundred sixty parts of wood cellulose in sheet form was steeped in a solution of sodium chloroacetate prepared by mixing together 580 parts of water, 48 parts of chloracetic acid, and 28 parts of sodium bicarbonate to which had been added .3% of sodium salts of acids prepared from primary branch chain alcohols of 6–8 carbon content, prepared synthetically by the reduction of carbon monoxide under pressure. After one hour, the sheets were pressed to 320 parts, the pressed sheets were shredded in a suitable disintegrator for one hour, and then 76 parts of sodium hydroxide in 84 parts of water was run in slowly. Mixing was continued for 16 hours. After aging for 48 hours, the product was purified by washing and dissolved in 6% caustic by cooling to $-10°$ C. It gave a moderately viscous, practically fiber free solution which could be cast to films of excellent wet strength. Solutions of these products were more free from fibers and filtered with greater ease than ethers of the same degree of substitution and viscosity made from the same cellulose either by the action of sodium chloroacetate on alkali cellulose, or by mixing cellulose with solid sodium chloroacetate, followed by addition of caustic. The quantity of reagent used in this preparation equalled ⅛ mol. per glucose unit of the cellulose. This gave a high degree of solubility as measured by the ease of filtration and freedom from insoluble fiber. A higher proportion of reagent (from one-eighth of one-quarter mol. of alkylating agent) must be used to attain the same degree of solubility using previously known processes.

Example 5

Nineteen hundred twenty parts of chloroacetic acid was mixed with 4320 parts of finely crushed ice. Into this was run slowly with vigorous stirring, 50% sodium hydroxide until the mixture was neutral to methyl orange. In this was steeped 1000 parts of sulfite wood cellulose containing 6% moisture and 86% alpha cellulose. After one-half hour, the sheets were pressed to 2000 parts. The pressed sheets were placed in a shredder, and after one-half hour of shredding, 600 parts of sodium hydroxide in 1200 parts of water were added slowly. Shredding was continued at a temperature below $30°$ for at least 8 hours. The shredded material was aged for 42 hours at $25°$ C. After aging the product was thrown into slightly more than the quantity of dilute sulfuric acid required for neutralization and was then washed acid free. It dissolved readily in 7% sodium hydroxide to give highly viscous, practically fiber free solutions. On cooling to $0°$ C., all fibers disappeared. Solutions of the product contained much less insoluble fiber and filtered with greater ease than ethers of the same viscosity and degree of substitution made from the same cellulose either by mixing of sodium chloroacetate with alkali cellulose or by mixing solid sodium chloroacetate with the cellulose followed by addition of caustic. The yield of product equalled 1000 parts. The quantity of reagent used was approximately one-half mol. of sodium chloroacetate per glucose unit of the cellulose.

Example 6

Eighty parts of wood cellulose in sheet form were steeped in a solution of sodium chloroacetate prepared by neutralizing 360 parts of chloroacetic acid in 680 parts of water with 320 parts of sodium bicarbonate. After 2 hours, the sheets were removed and pressed to a weight of 360 parts. The pressed sheets were placed in a shredder, and after being disintegrated for one hour, 80 parts of sodium hydroxide in 80 parts of water was run in slowly. Mixing was continued in the shredder for 20 hours. The product was aged until it was soluble in water in the form of its sodium salt. The quantity of reagent used corresponded to 2 mols of sodium chloroacetate per glucose unit of the cellulose.

Example 7

One hundred twenty parts of wood cellulose in sheet form was steeped in a mixture of 124 parts of glyceryl monochlorohydrin in 236 parts of water. After one hour, the product was pressed to 240 parts. The pressed sheets were placed in a suitable shredder and, after one hour of shredding, a solution of 69 parts of sodium hydroxide in 111 parts of water was run in slowly. After 2 more hours of mixing the material was removed from the shredder, aged for 48 hours, and purified by washing with hot water. The product dissolved to a highly viscous, substantially fiber free solution in 7% sodium hydroxide. The solutions were more free from fibers and filtered with greater ease than products of the same viscosity and degree of substitution prepared from the same cellulose either by mixing glyceryl monochlorohydrin with alkali cellulose, or by mixing glyceryl monochlorohydrin with cellulose, followed by addition of caustic, or by mixing a solution of glyceryl monochlorohydrin in acetone with the cellulose followed by addition of caustic. The quantity of reagent used equalled one-half mol of glyceryl monochlorohydrin per glucose unit based on the dry cellulose.

*Example 8*

The procedure was the same as in Example 7 except that the cellulose was steeped in a mixture of 124 parts of glyceryl monochlorohydrin, 200 parts of water, and 36 parts of ethyl alcohol. After one hour of steeping, the wet cellulose sheets were pressed to 240 parts. The product resembled that of Example 7 but was more easily dissolved.

*Example 9*

Eighty parts of wood cellulose in sheet form was steeped for one hour in a mixture of 136 parts of sodium methyl sulfate with 320 parts of water. The sheets were then pressed to 194 parts and disintegrated in a Monel metal shredder for one-half hour. Next a solution of 51 parts of sodium hydroxide in 109 parts of water was run in slowly and shredding continued for 16 hours. The product was aged for 24 hours. After purification by washing, the product was dried. The dried ether was stable. When dissolved in 6% sodium hydroxide at —8° C., it gave a moderately viscous solution containing an unusually small quantity of fiber. The solubility was a great deal better than was obtained either by the action of sodium methyl sulfate on alkali cellulose or by mixing sodium methyl sulfate with cellulose and then mixing with caustic. The quantity of sodium methyl sulfate used corresponded to one-half mol per glucose unit of the cellulose.

In the conventional methods of etherification in the preparation of incompletely substituted cellulose derivatives, it is customary to mix a small quantity of etherifying agent with a large quantity of alkali cellulose. Except in those cases where the etherifying agent is substantially volatile at the reaction temperature, and can disperse as a gas, it is mechanically impossible to mix an equal quantity of etherifying agent with each cellulose fiber. However, in order to become soluble, each fiber must receive a minimum of reactant. To insure that each fiber receives sufficient reagent to become soluble, it is necessary to use an excess of reagent and therefore certain portions of the mixture receive an excess of substitution. Therefore, for a given solubility, the average degree of substitution of the ether is higher than that theoretically required. By steeping in an aqueous solution of the etherifying agent and then pressing out the excess, this difficulty can be very largely overcome. In this process each fiber receives its quota of etherifying agent. Introduction of the caustic uniformly is not difficult in view of the relatively large volume. To insure uniformity a slight excess may be used without harm inasmuch as there is no relationship between the quantity of caustic and the degree of substitution attained, since the degree of etherification is controlled by the distribution in the initial steeping in the etherifying agent bath. Therefore, the present process gives products of a better uniformity for a given degree of substitution or of a lower degree of substitution for a given solubility. The improved uniformity manifests itself most distinctly in improved solubility. The products of the process filter better and contain much less insoluble fiber than low substituted cellulose ethers prepared either by the usual process of mixing the etherifying agent with the alkali cellulose or by first mixing the etherifying agent with the cellulose followed by addition and mixing in of the caustic.

In the formation of films, threads, etc., from low substituted ethers soluble in caustic or in water, the resistance of the formed object to weakening by water is related to the degree of substitution. With a given solubility, in order to attain maximum wet strength, it is desirable to maintain the degree of substitution at the lowest possible level. This is attained by the present process which gives soluble products of a lower degree of substitution.

In the present process, since no steeping of the cellulose in alkali occurs, no loss of cellulosic material by extraction of the steeping caustic occurs and the yield of product accordingly is greater.

The use of water as a solvent for the etherifying agent is of distinct advantage, due to greater penetration of the cellulose by the etherifying agent solution probably due to the swelling action of water, whereas in the treatment with organic solvents the reagent largely remains on the outside and penetrates the fiber but little. This also allows for uniform distribution of the etherifying agent by the use of an excess of etherifying agent, which excess is later reduced to the proper quantity by pressing.

The above description and examples are intended to be illustrative only. Any modification of or variation therefrom which conforms to the spirit of the invention is intended to be included within the scope of the claims.

We claim:

1. Process for the preparation of low substituted cellulose glycollic acid, which comprises steeping cellulose (1000 parts) in an aqueous solution of sodium chloroacetate containing approximately 2070 parts of sodium chloroacetate in approximately 5800 parts of water for two hours, pressing the impregnated cellulose to 2000 parts by weight, shredding the pressed impregnated cellulose for one-half hour, and mixing with 600 parts of sodium hydroxide in 1200 parts of water for at least eight hours.

2. Process of claim 1, characterized by the use in the sodium chloroacetate solution of .25% of sodium salts of acids prepared by the oxidation of the 6 to 8 carbon atom branched chain alcohols obtainable by the methanol synthesis.

3. Process for the preparation of alkali soluble low substituted cellulose glycollic acid, which comprises steeping cellulose in an aqueous solution of an alkali metal chloroacetate, pressing to remove excess solution, shredding and mixing the cellulose, impregnated with alkali metal chloroacetate solution, with a solution of caustic alkali.

4. Process of claim 3, wherein the alkali metal chloroacetate solution contains a small percentage of the sodium salts of the acids prepared by the oxidation of the six to eight carbon atom branched chain alcohols obtainable by the methanol synthesis.

5. Process for the preparation of alkali soluble low substituted glyceryl cellulose, which comprises steeping cellulose in an aqueous solution of glyceryl monochlorohydrin, pressing to remove excess solution, and mixing the thus treated cellulose with a caustic alkali solution.

6. Process for the preparation of alkali soluble low substituted cellulose ethers, which comprises steeping cellulose in an aqueous solution of an organic halide etherifying agent for cellulose, pressing to remove excess solution, and mixing the thus treated cellulose with a caustic alkali solution.

7. Process of claim 6, characterized by the use of a small amount of the sodium salts of the acids prepared by the oxidation of the six to eight carbon atom branched chain alcohols obtainable by the methanol synthesis in the aqueous solution of the etherifying agent.

8. Process for the preparation of alkali soluble low substituted alkyl cellulose, which comprises steeping cellulose in an aqueous solution of a water soluble alkylating agent, pressing to remove excess solution, and mixing the thus treated cellulose with a caustic alkali solution.

9. Process for the preparation of alkali soluble low substituted cellulose ethers, which comprises steeping short fibered cellulose in a large volume, with respect to the cellulose, of an aqueous solution of an organic halide etherifying agent for cellulose, said solution containing an excess both of water and etherifying agent, pressing to remove excess solution and to reduce the water and etherifying agent to the quantities necessary for the etherification, and mixing the thus treated cellulose with a caustic alkali solution.

10. Process for the preparation of alkali soluble low substituted methyl cellulose, which comprises steeping cellulose in an aqueous solution of an alkali metal methyl sulfate, pressing to remove excess solution, and mixing the thus treated cellulose with a caustic alkali solution.

11. Process for the preparation of alkali soluble low substituted cellulose ethers, which comprises steeping cellulose in an aqueous solution of a water soluble etherifying agent for cellulose, pressing to remove excess solution, shredding, and mixing the thus treated cellulose with a caustic alkali solution.

12. Process of claim 11, characterized by the use of a small amount of the sodium salts of the acids prepared by the oxidation of the six to eight carbon atom branched chain alcohols obtainable by the methanol synthesis in the aqueous solution of the etherifying agent.

13. Process for the preparation of alkali soluble low substituted cellulose glycollic acid, which comprises steeping cellulose in an aqueous solution of an alkali metal chloroacetate, removing the cellulosic mass from the steeping solution bath, removing excess steeping liquor from the cellulosic mass, shredding and mixing the cellulose, impregnated with alkali metal chloroacetate solution, with a solution of caustic alkali.

14. Process for the preparation of alkali soluble low substituted cellulose ethers, which comprises steeping cellulose in an aqueous solution of an organic halide etherifying agent for cellulose, removing excess steeping solution from the cellulosic mass, and mixing the thus treated cellulose with a caustic alkali solution.

15. Process for the preparation of alkali soluble low substituted cellulose ethers, which comprises steeping cellulose in an aqueous solution of a water soluble etherifying agent for cellulose, removing more of the steeping solution than adheres to the cellulosic mass upon removal from the steeping bath, and mixing the thus treated cellulose with a caustic alkali solution.

16. Process for the preparation of alkali soluble low substituted cellulose ethers, which comprises steeping short fibered cellulose in a large volume, with respect to the cellulose, of an aqueous solution of an organic halide etherifying agent for cellulose, said solution containing an excess both of water and etherifying agent, removing excess steeping solution from the cellulosic mass, and mixing the thus treated cellulose with a caustic alkali solution.

17. In the process of preparing alkali soluble low substituted cellulose ethers of high uniformity by reacting cellulose in the presence of alkali with a limited proportion of etherifying agent, the step which comprises steeping the cellulose before addition of the alkali in an excess volume of aqueous solution of a water soluble etherifying agent for cellulose, removing said excess of the steeping solution so as to leave the cellulose impregnated with the amount of etherifying agent required for subsequent etherification, mixing into the impregnated cellulose caustic alkali in aqueous solution, allowing the mixture to react until the product is alkali soluble, and thereupon terminating the reaction.

18. A process for the preparation of highly uniform alkali soluble low substituted cellulose ethers which comprises mixing cellulose with the necessary amount of an etherifying agent, and mixing the resulting cellulose-etherifying agent complex with alkali, the mixing of the cellulose and etherifying agent being accomplished by dissolving an excess of the etherifying agent in water, steeping the cellulose in the resultant solution, removing the steeped cellulose from the steeping bath and applying pressure to the steeped cellulose to separate it from excess etherifying agent.

19. In a process for the preparation of low substituted cellulose ethers possessing high uniformity and dilute aqueous sodium hydroxide solution solubility which comprises mixing cellulose with the necessary amount of an etherifying agent and mixing the resulting cellulose-etherifying agent complex with alkali, the steps of mixing the cellulose and etherifying agent by dissolving an excess of the etherifying agent in water, steeping the cellulose in the resultant solution, removing the steeped cellulose from the steeping bath, steeping cellulose in the resultant liquor and applying pressure to the steeped cellulose to separate it from excess etherifying agent.

20. Process for the preparation of alkali soluble low substituted cellulose ethers of high uniformity which comprises steeping cellulose in an aqueous solution of a monohalogen acetic acid etherifying agent for cellulose, pressing to remove the solution of etherifying agent in excess of that required to give 360 parts of pressed product for each 80 parts of the initial cellulose, and mixing the thus treated cellulose with a caustic alkali solution.

21. Process for the preparation of alkali soluble low substituted cellulose ethers of high uniformity which comprises steeping cellulose in an aqueous solution of a monohalogen acetic acid etherifying agent for cellulose, pressing to remove the solution of etherifying agent in excess of that required to give 360 parts of pressed product for each 80 parts of the initial cellulose, shredding, and mixing the thus treated cellulose with a caustic alkali solution.

JOSEPH F. HASKINS.
ROBERT W. MAXWELL.